April 12, 1932.　　　　T. PARIS　　　　1,854,059
EXERCISING DEVICE
Filed April 18, 1930　　　2 Sheets-Sheet 1
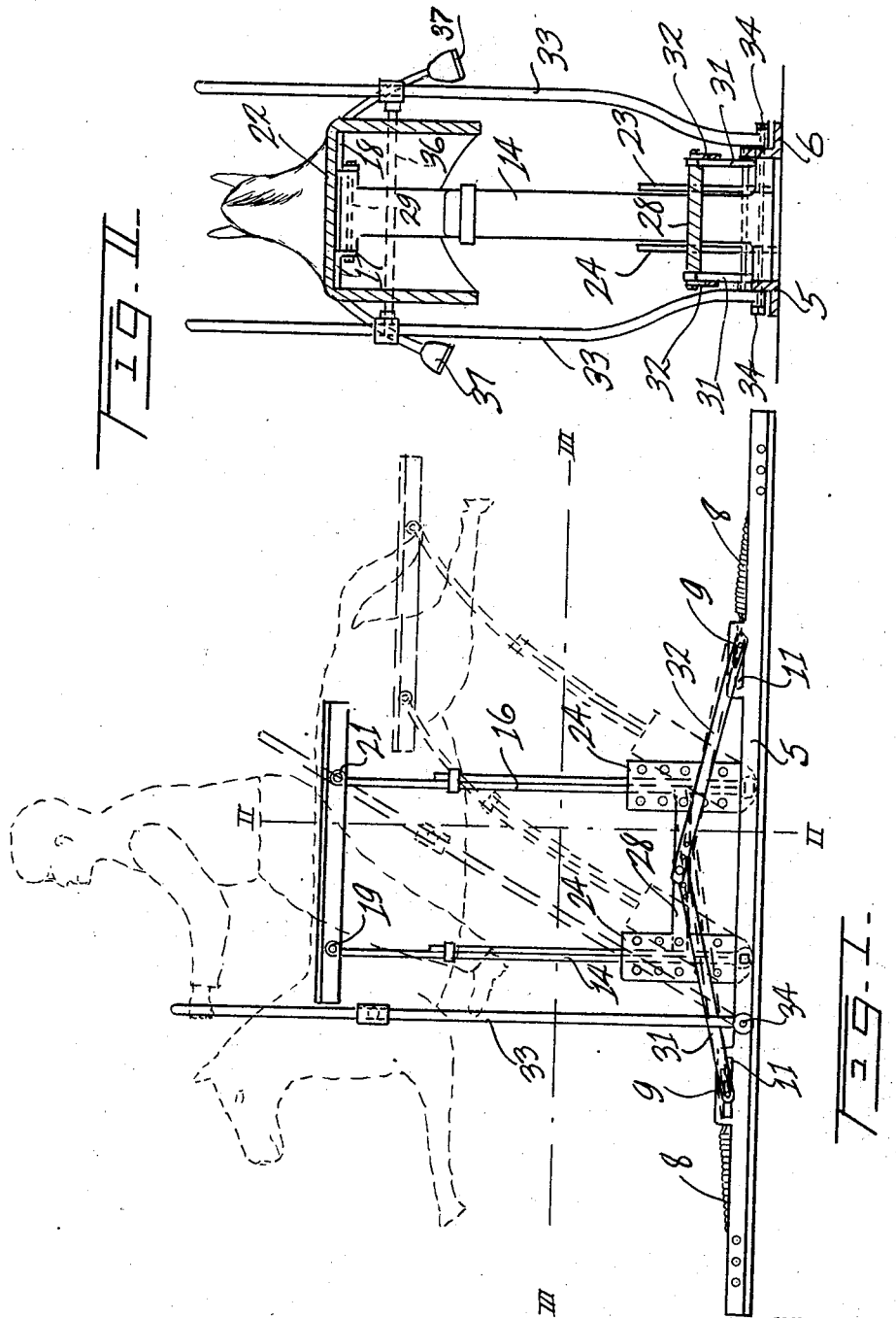
INVENTOR.
T. PARIS
BY Victor J. Evans
ATTORNEYS.

April 12, 1932.　　　　T. PARIS　　　　1,854,059
EXERCISING DEVICE
Filed April 18, 1930　　2 Sheets-Sheet 2
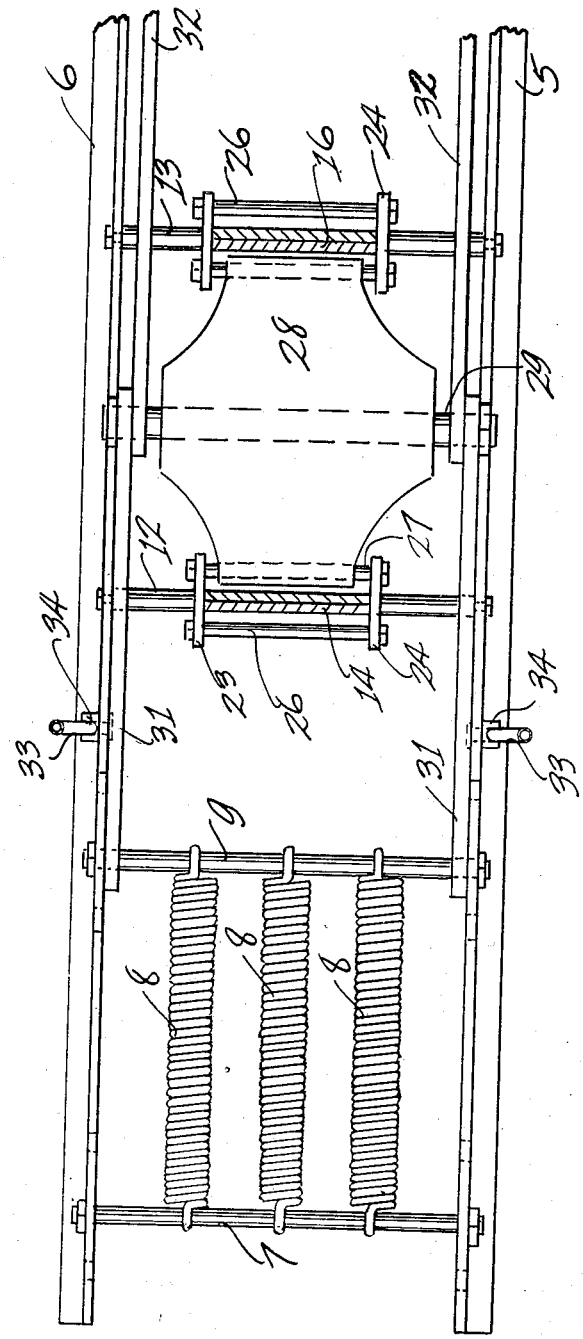
INVENTOR.
T. PARIS
BY Victor J. Evans
ATTORNEYS.

Patented Apr. 12, 1932

1,854,059

UNITED STATES PATENT OFFICE

THOMAS PARIS, OF LOS ANGELES, CALIFORNIA

EXERCISING DEVICE

Application filed April 18, 1930. Serial No. 445,428.

This invention relates to improvements in exercising devices, and has particular reference to a device which simulates a horse and therefore gives the action of horseback riding.

Another object is to produce an exercising device wherein all the muscles of the body will be brought into play.

Another object is to provide a device which is capable of adjustment so as to accommodate persons of different weight.

A further object is to provide a device which is economical to manufacture and one which is sturdy in construction.

A still further object is to provide a device which is neat in appearance and one which takes up a minimum amount of room.

Other objects and advantages will be apparent during the course of the following description.

In the accompanying drawings forming a part of this specification and in which like numerals are employed to designate like parts throughout the same, Figure 1 is a side elevation of my device showing the horse and rider in dotted lines, Figure 2 is a cross-sectional view taken on the line 2—2 of Figure 1, showing the horse in full lines, and Figure 3 is a fragmentary cross-sectional view taken on the line 3—3 of Figure 1, and on an enlarged scale.

It is a well known fact that horseback riding is a very healthy exercise in that the riding motion brings into play all the muscles of the body. I have therefore produced a device wherein these beneficial qualities are present, and in the accompanying drawings the numerals 5 and 6 designate angle iron members secured together at their ends by cross rods 7 to which a series of springs 8 are attached. The opposite ends of these springs are secured to sliding rods 9 which travel in slots 11 formed upon the angle iron members 5 and 6. Cross rods 12 and 13 extending between the angle irons 5 and 6 serve to support leaf spring standards 14 and 16, respectively. Carried upon the upper end of these standards are angles 17 and 18 which are pivoted thereto through the medium of bolts 19 and 21, the body of the horse rests upon the angles 17 and 18 and is secured thereto. The horse is designated by the numeral 22.

Plates 23 and 24 are secured to the opposite sides of the standards 14 and 16 and have a series of openings there-through, through which bolts 26 and 27 pass. Between the bolts 27 is positioned a plate 28 which carries a pivot pin 29 to which links 31 and 32 are pivoted. The opposite end of these links are slotted and engage the rods 9 at the opposite ends of the machine (see Figure 1).

A pair of handles 33 are pivoted to the angles 5 and 6 as shown at 34 and extend to a point above the body of the horse so that the operator may readily grasp the same. These handles are connected by a cross member 36 which extends through the body of the horse. Stirrups 37 are provided for the feet of the user.

In operation the user sits on the body of the horse with his feet in the stirrups and grasps the handles 33. By first pulling and then pushing upon the handles, motion is transmitted to the body of the horse which causes it to rock upon the springs 14 and 16 which rocking motion is transmitted through the plate 28 to the links 31 and 32. These links impart motion to the cross rods 9, which motion is resisted by the springs 8. By adjusting the cross rods 7 in one of several of the holes in the angles 5 and 6, the tension of the springs 8 may be increased or diminished. Also by adjusting the pivotal connection between the pivot pin 29 and the openings formed in the ends of the links 31 and 32, various adjustments may be made. By raising the bolts 27 into any of the holes in the plates 23 and 24, still further adjustment may be made of the device.

It will therefore be readily seen that by virtue of these various adjustments, the device may be made to accommodate persons of different weight, or the amount of effort required to operate the device may be readily changed. As the horse rocks back and forth the weight of the driver is thrown into the stirrups and an up and down motion given to the body as well as an arm motion, and consequently all of the muscles of body are brought into play.

It is to be understood that the form of my invention herewith shown and described is to be taken as a preferred example of the same and that various changes relative to the shape, size, material and arrangement of parts may be resorted to without departing from the spirit of the invention or the scope of the subjoined claims.

Having thus described my invention, I claim:—

1. In a device of the character described, a pair of spaced supports, a pair of vertically disposed spring members capable of being flexed and connected to said support, a seat arrangement carried by said spring members and linkage connected to said spring members and extending in opposite directions therefrom, and other spring members secured to said linkage and said supports for yieldingly retaining said vertically disposed spring members in upright position.

2. In a device of the character described, a pair of spaced angle members, stationary cross rods extending between said angle members, slidable cross rods carried by said spaced members, springs secured to said stationary cross rods and having their opposite ends secured to said sliding cross rods, links connecting said sliding cross rods, a pair of flat spring members vertically supported between said angle members, a plate for retaining said flat spring members in their normal position, an occupant supporting surface connected to the upper end of said members and a pair of handles pivoted to said angle members and connected to said supporting surface and adapted to be grasped by the occupant of said device.

In testimony whereof I affix my signature.

THOMAS PARIS.